United States Patent Office

3,337,607
Patented Aug. 22, 1967

3,337,607
PROCESS FOR PREPARATION OF AN
AMINE NITRILE
John C. Wollensak, Royal Oak, Mich., assignor to Ethyl
Corporation, New York, N.Y., a corporation of Virginia
No Drawing. Filed Jan. 25, 1965, Ser. No. 427,947
5 Claims. (Cl. 260—465.5)

ABSTRACT OF THE DISCLOSURE

An amine nitrile is prepared in high yield by adding hydrogen cyanide to a mixture of formaldehyde and an amine or ammonia salt of a strong acid. For example, high yields of nitrilotriacetonitrile are obtained by adding HCN to formaldehyde and ammonium sulfate. Furthermore, it has been discovered that amine nitriles such as nitrilotriacetonitrile readily form a crystallized salt of the corresponding acid when hydrolyzed by a mixture of water, alkali metal hydroxide, and an alkanol.

This invention relates to a process for the preparation of amine nitriles. In a particular embodiment, it relates to a process for preparing nitrilotriacetonitrile.

In U.S. 2,855,428, Oct. 7, 1958, it has been proposed that nitrilotriacetonitrile be prepared by reacting formaldehyde, hydrogen cyanide, and ammonia in the presence of water and a small quantity of sulfuric acid. In the patent it is taught that the ammonia be added to an aqueous solution of the other aforementioned reactants. The process has many decided disadvantages, chief among which are the inability to obtain a high yield of the desired nitrile product and an inability to add a substantially stoichiometric quantity of ammonia to the reaction medium without an attendant untoward increment in pH and a deleterious darkening of the reaction medium due to one or more extraneous side reactions.

A prime object of this invention is to circumvent the drawbacks of the prior art process. A more particular object is to provide a process for the preparation of high yields of amine nitriles. Still another object is to provide an improved method for the preparation of nitrilotriacetic acid and salts thereof. Additional objects will be apparent from the following detailed description and appended claims.

The objects of this invention are accomplished by providing a process for the preparation of an amine nitrile, said process comprising adding hydrogen cyanide to a system comprising water, formaldehyde, and a salt selected from the class consisting of ammonium salts and amine salts and maintaining the reaction mixture thereby produced under reaction conditions whereby said amine nitrile is produced.

In a more preferred embodiment, the following process is provided: A process for the preparation of nitrilotriacetonitrile, said process comprising adding HCN to a system comprising water, formaldehyde and an ammonium salt of a strong, nonoxidizing, mineral acid such that the amount of HCN added is substantially stoichiometric as to said ammonium sulfate, and maintaining the reaction mixture thereby produced under reaction conditions whereby said nitrilotriacetonitrile is obtained.

A highly preferred embodiment comprises a process for the preparation of trisodium nitrilotriacetate, said process comprising (1) adding HCN to a system comprising water, formaldehyde, and ammonium sulfate such that the amount of HCN added is substantially stoichiometric as to said ammonium sulfate,
(2) maintaining the reaction mixture thereby obtained under reaction conditions, whereby nitrilotriacetonitrile is produced,
(3) separating said nitrilotriacetonitrile, and
(4) hydrolyzing said nitrilotriacetonitrile with water and an alkali metal hydroxide in the presence of a lower alkanol reaction medium.

The process of this invention provides improved yields of amine nitriles such as nitrilotriacetonitrile in a simple and convenient manner. Some of the advantages of this process are that comparatively elevated temperatures can readily be employed, the vaporization of hydrogen cyanide from the reaction medium is practically eliminated, and highly efficient condensing means are not required. For example, processes which comprise the addition of amine to a reaction mixture containing hydrogen cyanide are severely limited by the low boiling point of HCN (26° C.). In these prior art processes, if reaction temperatures higher than said boiling point are used, the hydrogen cyanide will vaporize and safety precuations require highly efficient condensing means to liquefy the vapors. In contrast, the process of this invention is not severely limited by the boiling point of hydrogen cyanide because large amount of hydrogen cyanide are not present in the reacting mixture. In fact, the addition of HCN can be regulated to avoid the presence of a dangerous amount of that substance in the reacting medium. This is readily accomplished because the reaction of HCN with the other reactants is very rapid. In this manner, the vaporization of hydrogen cyanide from the reaction mixture is minimized, and the need for highly efficient condensing means eliminated. However, for safety, a condenser is usually employed when carrying out the process of this invention. The condenser need not be as efficient as that employed when using the prior art process.

Hence, a critical feature of the process of this invention is that the hydrogen cyanide is added to a system containing the other reactants, particularly the amine salt. Another feature which aids in obtaining improved yields of desired amine nitrile product is that the amine salt is employed as a reactant and a comparatively small amount of free amine is present within the reaction system. Preferably, no free amine is present.

When preparing amine nitriles according to the process of this invention, three reactants are employed; namely, formaldehyde, hydrogen cyanide, and the amine salt. The process is conveniently carried out in the presence of a liquid reaction medium, preferably an aqueous medium such as water, acidified water, or a mixture of water (or acidified water) and an inert organic solvent.

Formaldehyde from any source can be employed in the process of this invention. The commercial solutions containing 37 and 50 percent by weight formaldehyde are conveniently employed. In some instances the stabilizers present within the commercial solutions have a deleterious effect on the process. For this reason it is preferred that a stabilizer-free solution of formaldehyde be employed. Solutions of this type, having up to about 50 percent by weight formaldehyde are conveniently prepared by depolymerizing paraformaldehyde in any known manner. Thus, for example, the depolymerization can be carried out by treating paraformaldehyde powder with water containing a catalytic quantity of a mineral acid such as sulfuric acid and then heating.

The hydrogen cyanide can be either in the liquid or gaseous state: liquid hydrogen cyanide is conveniently employed in this process.

The amine salt employed has a profound effect on the nature of the product obtained. For example, if a salt of ethylene diamine is employed, the product is ethylene diamine tetraacetonitrile. Similarly, if an ammonium salt is employed, the product is nitrilotriacetonitrile. The process of this invention is widely applicable and salts of any amine having a replaceable hydrogen atom bonded to an amine nitrogen atom can be employed in this process. Amines of this type are commonly referred to as primary and secondary amines. Moreover, as mentioned above, the process of this invention can be applied to ammonium salts and, in general, salts of this type are preferred. One reason for the preferability of this type of salt is that the trisodium salt of nitrilotriacetic acid (which is readily obtained from nitrilotriacetonitrile) is rapidly becoming of enhanced importance in the preparation of modern soap and detergent formulations. The ammonium salt employed in the process can be obtained by the decomposition of ammonia generating materials such as hexamethylenetetramine in the presence of a suitable acid.

The amine salts employed as reactants in this process are derived by reacting the amine with a strong acid. In general, acids of sufficient strength have an acid dissociation constant of about $8.0 \times 10^{-3}$ or greater (or a $pK_A$ of about 2.1 or less). Since the free acid is generated as a by-product in this process, it is desirable that the acid, and likewise the anion derivable therefrom, be inert toward the other reactants in the process as well as the desired nitrile product. Consequently, acids which are non-oxidizing in nature are preferred. Typical preferred acids are the common mineral acids such as sulfuric, hydrochloric, orthophosphoric, and the like. Of these acids, sulfuric acid is highly preferred.

A preformed amine or ammonium salt can be employed in the process. Alternatively, the salt may be generated within the reaction system by admixing a stoichiometric amount of acid, of the type described above, with the amine or ammonia prior to the addition of the hydrogen cyanide to the reaction system. Somewhat less than a stoichiometric quantity of acid can be employed; however, at least enough acid to convert about 90 percent of the amine present to the salt should be used.

As pointed out above, the process of this invention is preferably carried out in an aqueous reaction medium. It is highly desirable that the medium be acidic since an acidic reaction medium prevents polymerization of the hydrogen cyanide. Preferably, the pH of the reaction system is no higher than about 3.0 and preferably below 1.0. In most instances, the desired acidity is obtained by the spontaneous hydrolysis of the amine or ammonium salt of the strong acid and the reaction of the formaldehyde with the amine salt which produces the strong acid as a by-product. If desired, additional acid can be added to the reaction medium. More than a stoichiometric quantity of strong acid can be employed in the process. In other words, an amount of mineral acid over and above that required to bind the amine or ammonia as a salt can be used, if desired. In fact, there is no real upper limit in amount of acid and the upper limit is largely governed by economics and size of the reaction vessels employed. When an excess of mineral acid is desired, up to a 10 or 100 percent excess is usually sufficient. When using solutions of formaldehyde obtained by depolymerizing paraformaldehyde in the presence of sulfuric acid, the sulfuric acid employed in the depolymerization process need not be removed and the acid can be used in the reaction system to insure that an acid pH is maintained.

The amount of reaction medium employed is not critical, and any convenient amount is preferred. In many instances, the nitrile product is insoluble in the aqueous reaction medium and starts to precipitate out shortly after reaction temperatures are reached. In general, the amount of water in the reaction medium can be varied between an amount by weight equal to or up to about 10 times as great as the amount of formaldehyde employed. Greater or smaller amounts of water can be employed if desired. If desired, the water can be admixed with any inert organic solvent. Applicable solvents are those which are inert under the reaction conditions employed and do not react with the reactants or the desired nitrile product. Typical inert organic media are alcohols, acids, ethers, halogenated hydrocarbons, and the like. Typical alcohols which may be employed are octanol and sec-butanol; typical acids, acetic and propionic acid; typical ethers; n-butyl ether and dimethoxyethane; typical halogenated hydrocarbons, chloroform and methylene chloride.

The process of this invention can be carried out as a batch process or as a continuous or semi-continuous process. When using recycle steps, it is preferred that the amine salt reactant be generated by adding the amine to acid present in the reaction medium rather than employing multiple additions of a preformed salt. This preferred operative expedient avoids a build-up of acid by-product during the successive cycles.

The process of this invention is conveniently carried out under mild temperature conditions; e.g., from about 0° to about 50° C. However, temperatures as high as about 90 or 100° C. can be employed if desired. Preferably, the reaction temperature is within the range of from about 5° to about 100° C.

The reaction pressure is not critical and any convenient pressure can be employed. Preferably, the reaction is carried out at atmospheric pressure.

The time of the reaction is not a truly independent variable but is dependent at least to some extent on the other reaction conditions employed. For example, in many instances, higher temperatures afford low reaction times. Furthermore, in many instances the reaction time can be decreased by agitating the reaction medium, for example, by stirring. In general, reaction times within the order of about 15 minutes to 14 hours are sufficient.

The process of this invention, in many instances, yields best results when the amount of hydrogen cyanide employed is substantially stoichiometric as to the amine salt. For example, when ammonium salt is employed as the reactant, it is desired that there be added nearly three moles of hydrogen cyanide for each mole of ammonia incorporated within the ammonium salt. Preferably, at least six moles of HCN are employed for each mole of ammonium sulfate. Greater or lesser amounts of hydrogen cyanide can be employed, but it is preferred that the amount be within 10 percent lesser to 10 percent greater than the stoichiometric quantity. In many instances, a slight excess of formaldehyde is desirable. It is preferred that at least a stoichiometric quantity of formaldehyde be available for reaction. If an excess of formaldehyde is desired, the degree of excess is not critical and is largely determined by economics. Usually, if an excess is desired, up to a 10 or 100 percent excess is sufficient.

The nitrile product produced by the process of this invention can be hydrolyzed. Hydrolysis to the free acid is accomplished by reacting the nitrile with a strong acid such as sulfuric or hydrochloric acid. Salts of the corresponding acid can be obtained by hydrolysis in the presence of an alkali; preferably, the alkali is sodium hydroxide.

When the desired end product is a salt of the corresponding acid, it is preferred that the hydrolysis be carried out in the presence of a lower alkanol reaction medium. In general, the salts are less soluble in media of this type and are more readily precipitated. Convenient alcoholic media are obtained by admixing the desired amount of alkali with an alcohol containing from 1 to 4 carbon atoms. Preferred alcohols are saturated and are exemplified by methanol, ethanol, isopropanol, sec-butanol and the like. A highly preferred alcoholic reaction medium is obtained by admixing the alkali with methanol.

The following examples serve to illustrate the process of this invention but do not limit it. All parts are by weight unless otherwise indicated. (The first example illustrates the type of result obtained when the process of U.S. 2,855,428 is employed. The process of that example is included herein for comparison purposes to point out the benefits derived from the process of this invention. The process of this invention is illustrated specifically by the examples following Example I.)

*Example I*

(A) To a reaction vessel equipped with stirring, heating, condensing, pH-indicating means and liquid-addition means was added 256 parts of 37.7 percent formaldehyde solution (formalin) and 2.75 parts of concentrated sulfuric acid. While stirring the resultant mixture rapidly, 87.7 parts of 96 percent liquid hydrogen cyanide was added over a six-minute period. The reaction mixture temperature dropped from 23° to 22° C. and the pH also dropped from 0.6 to 0.2 during the hydrogen cyanide addition. The mole ratio of formaldehyde-to-hydrogen cyanide was 3.25–3.25.

The mixture was heated, and at 45° C. the hydrogen cyanide began to reflux. While maintaining the reaction mixture under reflux conditions, the addition of ammonia to the reaction vessel was started. The pH of the solution rose rapidly to 1.2 and the ammonia addition was terminated for a short time to permit the pH to drop. This intermittent ammonia addition was continued for 135 minutes, during which time the pH range of the reaction mixture was maintained between 0.65 and 1.1.

At this point, the amount of ammonia added was considerably less than the amount required by theory, that is, the mole ratio of ammonia-to-hydrogen cyanide was much less than 1.08 to 3.25. To permit the addition of additional ammonia, another 2.79 part portion of concentrated sulfuric acid (dissolved in 9.0 parts of water) was added to the reaction mixture. The pH decreased to 0.45 and the ammonia addition was restarted. The temperature of the reaction mixture had increased to 57° C.

Ammonia was added slowly to the reaction mixture for an additional 100 minutes. After that time a total of nearly 9.2 parts of ammonia had been charged to the reaction vessel. During the 100 minutes period the pH was maintained near 1.0 and the reaction temperature near 69° C. Following the 100-minute period mentioned above, on adding a small increment of ammonia (a little more rapidly), the pH increased 1.5 to 6.6. The ammonia addition was discontinued and the total amount of ammonia charged to the reaction vessel was 9.2 parts which was considerably less than the 18.3 parts required by theory.

After the reaction mixture stood overnight, the reaction flask contained a white precipitate. This precipitate, which was nitrilotriacetonitrile, was filtered and dried. A total of 24.4 parts (33.7 percent yield) of nitrilotriacetonitrile, M.P. 126.5–128° C. was obtained.

The reaction mixture was allowed to stand for two additional days during which the solution changed from water white to black. Similar results are obtained if the above experiment is repeated using a 3.0:3.0:1.0 ratio of HCHO, NCH, and NH$_3$, respectively.

(B) The above experiment was essentially repeated. However, only one portion of 2.79 parts of sulfuric acid was employed. Furthermore, the total amount of ammonia added was 18.2 parts. In this experiment, after about one-half of the ammonia was added, an additional amount (25.5 parts) of 37.3 percent formalin and 16.2 parts of hydrogen cyanide was charged to the flask. The total amount of 96 percent hydrogen cyanide was 102.4 parts and the total amount of formaldehyde added was 95.5 parts. As in the previous experiment, considerable difficulty was experienced while attempting to maintain a low pH level. At the end of the experiment the pH was 6.4. The next morning the reaction mixture had darkened and the pH had increased to 8.2. No nitrilotriacetonitrile product was obtained.

(C) The experiment above was essentially repeated except that the amount of formaldehyde and HCN was decreased to 57.0 parts and 70.7 parts, respectively. (The formaldehyde was added as 37.3 percent formalin solution.) Furthermore, the amount of sulfuric acid was increased to 18.6 parts.

The ammonia (8.5 parts) was added over a 45-minute period and the pH level maintained between 0.3 and 2.0. During the subsequent one-hour reaction period (temperature 68° to 70° C.) the pH dropped to 1.6. The reaction solution was clear and water-white and remained so even after standing for ten days. The total amount of precipitated product was 18.2 parts of impure nitrilotriacetonitrile, M.P. 100°–127° C., yield 26.9 percent.

(D) The reaction was repeated using the following ingredients:

60.0 parts of formaldehyde (as paraformaldehyde),
100 parts of water,
69 parts of 96 percent hydrogen cyanide,
8.5 parts of ammonia, and
18.6 parts of concentrated sulfuric acid, Nitrilotriacetonitrile, 33.9 parts, M.P. 125°–127° C. (49.1 percent yield) was obtained. The hydrogen cyanide was added over a five-minute period at 24° C. and the pH level of the solution dropped from 0.5 to 0.25 during the addition. Following the addition of the hydrogen cyanide the ammonia was added over a 45-minute period. During this time the temperature was within the range of 35° to 50° C. After all the ammonia was added the resultant mixture was maintained for one hour at a temperature within the range of 62°–67° C. During this time the solution color changed from pale blue to light brown.

The above experiments illustrate the comparatively low yields of nitrilotriacetonitrile obtained when the prior art method of adding ammonia to the other ingredients is employed. The example also illustrates the difficulty encountered in maintaining the pH of the reaction medium and the lengthy ammonia addition time encountered when the prior art method is used.

*Example II*

To a reaction vessel equipped with heating, cooling, stirring, condensing and pH-indicating means was added 47.25 grams of formaldehyde as a 36.1 percent formalin solution. Thereafter, 187 parts of water and 18.3 parts of concentrated sulfuric acid was charged to the reaction vessel. A total of 8.5 parts of ammonia was added over a period of 25 minutes while cooling the vessel and contents. During this time the temperature was decreased from 22° to 18° C. by cooling the mixture and the pH increased from 0.18 to 2.02.

After maintaining the vessel contents at 14°–19° C. for 1½ hours the pH had decreased to 1.61 and the addition of hydrogen cyanide was initiated. The hydrogen cyanide, 42.3 parts (96 percent purity) was added over a period of 30 minutes, during which time the temperature was allowed to rise to 52–54° C. After the addition of hydrogen cyanide the pH of the reaction mixture was 0.75. The mole ratio of reactants were: 1.58:1.51:0.5:0.187; formaldehyde; hydrogen cyanide:ammonia:sulfuric acid, respectively.

After maintaining the reaction temperature at 60–66.5° for 65 minutes a white solid precipitated. The resultant mixture was maintained at 66.5–68° C. for an hour and 25 minutes and then cooled to 30° C.

The contents of the reaction vessel were discharged and the white solid precipitate filtered and dried. The solid, 50.2 parts of nitrilotriacetonitrile, M.P. 125–7° C. (74.9 percent yield) was obtained. Similar results are obtained when the sulfuric acid in the above process is replaced with either hydrochloric or orthophosphoric acid.

*Example III*

After the precipitated nitrilotriacetonitrile produced in Example II was removed by filtration the water-white filtrate was recharged to the reaction vessel. Thereafter, 49.75 parts of formaldehyde as 95 percent paraformaldehyde was added to the vessel. Ammonia, 8.5 parts, was then added to the reaction vessel over a period of an hour and 37 minutes. During this time the reaction temperature was allowed to increase from 23° to 30° C. The pH increased from 0.70 to 6.03.

Thereafter, the temperature of the reaction mixture was allowed to increase to 69° over a period of 35 minutes. Heating was continued for an additional 70 minutes until the temperature of the reaction vessel contents was 97° C. The temperature was then decreased to 31° C. and the addition of hydrogen cyanide initiated. A total of 45.65 parts of hydrogen cyanide (96 percent pure) was added over a period of 23 minutes. After that time the temperature of the vessel contents had increased to 50° C.

The temperature of the contents was maintained between 66° and 70° C. for a period of two hours. After that time the pH was 0.83. During the two-hour heating period a white solid precipitated. The mole ratio of formaldehyde to hydrogen cyanide to ammonia was 1.58:1.62:0.5.

The solid was removed by filtration and dried. The solid was nitrilotriacetonitrile and 41.8 parts thereof (62.5 percent yield) was obtained.

Following the procedure for the above example but replacing ethylenediamine dihydrochloride for the ammonia used above, ethylenediaminetetracetonitrile is produced. This product can be hydrolyzed to ethylenediaminetetracetic acid. The disodium salt of this acid is useful as a chelating or sequestering agent.

*Example IV*

To a reaction vessel similar to that employed in Example III was added 66 parts of ammonium sulfate and 100 ml. of water. Thereafter, 250 grams of a 36.1 percent formalin solution was charged to the reaction vessel. The temperature of the vessel contents was increase from 27° C. to 40° C., and the addition of 86 parts of hydrogen cyanide initiated.

The hydrogen cyanide addition was complete after 22 minutes. During that time the temperature of the vessel contents had fluctuated from 40 to 49 and then back to 45° C. and the pH had decreased from 0.85 to 0.10.

The temperature of the reaction contents was raised to 50° C. and then allowed to increase to 60–62° C. over a three-hour period.

The resultant slurry was cooled to 10° C. and filtered. The white crystalline solid, nitrilotriacetonitrile, was dried. A total of 108 parts of nitrilotriacetonitrile (80.6 percent yield) was obtained. In this example the mole ratio of formaldehyde to HCN to ammonium sulfate was 3.01 to 3.06 to 1.00.

*Example V*

The procedure of Example IV was essentially followed. However, in this process a total of 90.2 parts of formaldehyde, 258.8 parts of water, 82.1 parts of hydrogen cyanide and 66 parts of ammonium sulfate were reacted. The formaldehyde (as a 36.1 percent formalin solution) and the hydrogen cyanide were added alternatively to the other reaction ingredients. There was obtained 99.8 parts (74.5 percent yield) of white granular nitrilotriacetonitrile. In this example the mole ratio of formaldehyde to hydrogen cyanide to ammonium sulfate was 3.01:2.92:1.00.

*Example VI*

To a reaction vessel similar to that employed in Example II was added 108 parts of 95 percent formaldehyde, 143 parts of water and 49.2 parts of sulfuric acid. The mixture was heated to 95° C. and the formaldehyde went into solution.

The reaction contents were cooled to 33° C. and over a period of 17 minutes, 17.6 parts of ammonia was added. The temperature at this time had increased to 36° C. and the pH from 0.0 to 0.75. Following that, over a 28 minute period 87.3 parts of hydrogen cyanide was added to the vessel contents. Shortly thereafter a solid began precipitating from the resultant solution. The solution had a pH of 0.0. The temperature of the resultant mixture was maintained between 45° and 60° for approximately a two-hour period.

The resultant mixture was then cooled to 10° C. and filtered. The precipitate was dried. A total of 121 parts (87 percent yield) of white crystalline nitrilotriacetonitrile, M.P. 126–217° C., was obtained.

In this experiment the mole ratio of the reactants was 3.42:3.11:1.04:0.502; formaldehyde, hydrogen cyanide, ammonia and sulfuric acid, respectively.

*Example VII*

To a reaction vessel similar to that employed in Example II was charged the filtrate resulting from the removal of the nitrilotriacetonitrile precipitate in the previous example. Thereafter, 91 parts of 95 percent paraformaldehyde, 81.6 parts of water and 16.3 parts of ammonia was charged to the reaction vessel. Following that, 81 parts of 96 percent hydrogen cyanide was added to the resultant mixture.

Following the hydrogen cyanide addition the temperature was allowed to increase from 41° C. to 64° C. over a period of approximately ½ hour. The temperature then was allowed to slowly decrease from 64° C. to 50° C. over an approximately 1½ hour period. In this example the mole ratio of formaldehyde to hydrogen cyanide to ammonia was 2.88:2.88:0.95.

The resultant reaction mixture was cooled to 10° C. and filtered. The dried white solid precipitate, 121 parts, was nitrilotriacetonitrile (94.1 percent yield). The product had a melting point of 125–127° C.

In a third cycle, the filtrate obtained after removal of the nitrilotriacetonitrile precipitate was recharged to the reaction vessel and another cycle carried out. In this cycle 98.8 parts of formaldehyde (104 parts of 95 percent paraformaldehyde), 94 parts of water, 92.4 parts of 96 percent HCN, 20.6 parts of ammonia and 4.5 parts of sulfuric acid was added to the filtrate. As in the previous experiments the hydrogen cyanide was added after the ammonia had been charged to the vessel.

A 96.2 percent yield of a somewhat impure batch of nitrilotriacetonitrile was obtained as a product. When the third cycle was repeated in a similar process except that 15.7 parts of ammonia were employed, the purity of the nitrilotriacetonitrile produced was increased.

*Example VIII*

To a reaction vessel similar to that employed in Example II was charged 56.8 parts of paraformaldehyde, 162 parts of water, and 36.7 parts of sulfuric acid. The mixture was heated until the paraformaldehyde went into solution (at about 65° C.). To the resultant mixture was added 37.8 parts of hexamethylenetetramine. Thereafter, 88.7 parts of hydrogen cyanide were added.

Following the general procedure of Example II an 89.8 percent yield of nitrilotriacetonitrile was obtained. The nitrilotriacetonitrile product had a melting point of 125–127° C.

*Example IX*

A reaction vessel equipped with stirring means, temperature indicating means, condensing means and liquid addition means was employed. To the vessel was charged 6 parts of water, 12.9 parts of 98 percent sodium hydroxide and 48 parts of methanol. On stirring the sodium hydroxide dissolved and the reaction mixture began to reflux. While maintaining reflux, 13.4 parts of nitrilotriacetonitrile was added incrementally. After the addition was complete the flask was heated and a solid began precipitating. The precipitation was accomplished with ammonia evolution. After boiling for one hour the ammonia evolution ceased and the boiling point dropped to 68° C. The flask was cooled and the contents filtered. A yield of 90.7 percent of the trisodium salt of nitrilotriacetic acid was obtained. Similar results are obtained if the methanol is replaced with isopropanol, ethanol or n-butanol. When employing a hydrolysis mixture containing a lower alcohol, as in the previous example, the product salt of nitrilotriacetic acid precipitates more readily than when a nonalcoholic hydrolysis mixture is employed.

The hydrolysis of the nitrile to the metal salt in the presence of alcohol, as exemplified in Example IX, can be carried out in the presence of a greater amount of water than that employed in the process of the example. In general, the amount of water employed can be within the range of from the stoichiometric amount to a tenfold excess. The amount of alkanol can be varied within the range of from about 5 times to 15 times the weight of water employed.

The alcoholic portion of the hydrolysis mixture may be a single alcohol, as in the last example, or a mixture of alcohols such as methanol and ethanol. Moreover, some or all of the alcohol may be substituted with an ether such as tetrahydrofuran, methyl carbitol, diethyleneglycol dimethyl ether and the like.

As demonstrated by the last example the nitrilotriacetonitrile can be hydrolyzed to form a water-soluble salt of nitrilotriacetic acid. Salts of this type are excellent builders in detergent formulations. When employed in this manner the detergent may be selected from an anionic synthetic soapless detergent, a non-ionic detergent, an amphoteric electrolyte detergent, zwitter-ionic detergent or mixture thereof. In addition to the nitrilotriacetic acid builders such as water-soluble inorganic polyphosphates or ethane-1-hydroxyl-1, 1-diphosphonic acid can be employed.

Having fully described the novel process of this invention, the advantages thereof, the products produced thereby and their utilities, it is desired that this invention be limited only within the lawful scope of the appended claims.

I claim:
1. Process for the preparation of nitrilotriacetonitrile, said process comprising
    (1) adding HCN to a mixture of water, formaldehyde, and an ammonium salt selected from the class consisting of ammonium chloride, ammonium phosphate, and ammonium sulfate,
        said mixture having an acidic pH and being further characterized in that the amount of said formaldehyde (relative to the amount of said ammonium salt) is from about 2.4 percent less than stoichiometric, to 10 percent greater than stoichiometric,
    such that the amount of HCN added is within 10 percent of the stoichiometric amount (based on the amount of said ammonium salt); and
    (2) maintaining the reaction mixture at a temperature within the range of from about 5° to about 100° C., whereby said nitrilotriacetonitrile is obtained.
2. The process of claim 1 wherein said ammonium salt is ammonium sulfate.
3. The process of claim 2 wherein from 6.0 to 6.6 moles of HCN are added per each mole of ammonium sulfate present in said mixture.
4. The process of claim 2 wherein said mixture is prepared by mixing
    (a) said water
    (b) said formaldehyde
    (c) ammonia, and
    (d) from 90 to 100 percent of the amount of sulfuric acid required to transform all of said ammonia to said ammonium sulfate.
5. In a process for preparing nitrilotriacetonitrile from HCN, formaldehyde, and ammonium sulfate, the improvement consisting essentially of adding HCN to an aqueous mixture of formaldehyde and ammonium sulfate, said mixture having an acidic pH; and reacting the resultant reaction mass at a temperature of 5° to 100° C.

No references cited.

CHARLES B. PARKER, *Primary Examiner.*

JOSEPH P. BRUST, *Examiner.*

UNITED STATES PATENT OFFICE
CERTIFICATE OF CORRECTION

Patent No. 3,337,607                              August 22, 1967

John C. Wollensak

It is hereby certified that error appears in the above numbered patent requiring correction and that the said Letters Patent should read as corrected below.

Column 5, line 8, for "37.7" read -- 37.3 --; line 9, for "2.75" read -- 2.79 --; column 7, line 56, for "258.8" read -- 259.8 --.

Signed and sealed this 30th day of July 1968.

(SEAL)
Attest:

Edward M. Fletcher, Jr.                              EDWARD J. BRENNER

Attesting Officer                                        Commissioner of Patents